United States Patent [19]

Bahr et al.

[11] Patent Number: 4,601,586
[45] Date of Patent: Jul. 22, 1986

[54] SOLICITED MESSAGE PACKET TRANSFER SYSTEM

[75] Inventors: Richard G. Bahr, Framingham; Daryl F. Kinney, Holliston; Alan G. Nemeth, Framingham; Helen S. Raizen, Jamaica Plain, all of Mass.

[73] Assignee: Prime Computer, Inc., Natick, Mass.

[21] Appl. No.: 579,090

[22] Filed: Feb. 10, 1984

[51] Int. Cl.[4] ............................................. H04J 3/26
[52] U.S. Cl. ................................... 370/94; 364/200
[58] Field of Search .......................... 370/94, 60, 85; 340/825.5, 825.51; 364/200, 900

[56] References Cited

U.S. PATENT DOCUMENTS

| 4,281,380 | 7/1981 | DeMesa et al. | 370/94 |
| 4,354,263 | 10/1982 | Bordry et al. | 370/94 |
| 4,410,983 | 10/1983 | Cope | 370/85 |
| 4,476,467 | 10/1984 | Terwilliger et al. | 370/94 |

Primary Examiner—Douglas W. Olms
Attorney, Agent, or Firm—Lahive & Cockfield

[57] ABSTRACT

A system for transferring solicited message packets between data processors coupled on a serial communications path. A solicitor processor allocates a portion of its memory for storage of solicited message packets which might be solicited and received from at least one other data processor. The solicitor data processor defines a sequence of operations to be performed on any such received solicited message packets at that processor. The solicitor processor also transfers a solicited message parameter signal to the solicitee data processor where that signal is representative of a predetermined header portion for solicited data packets which might be generated by the solicitee data processor and transferred to the solicitor data processor. The header portion of a solicited message packet relates one or more of the sequences of operations which are to be associated with that packet. At least one of the other data processors receives any solicited message parameter signal addressed to that solicitee data processor. The solicitee processor is responsive to a received message parameter signal to generate a solicited message packet (with a header portion, as defined by the solicited message parameter signal) for transfer to the solicitor processor. The solicitor processor receives any such transmitted solicited message packet and stores that packet in the allocated portion of memory.

17 Claims, 1 Drawing Figure

SOLICITED MESSAGE PACKET TRANSFER SYSTEM

BACKGROUND OF THE INVENTION

The present invention is related to data processing systems, and more particularly to data processors coupled in a network configuration.

It is known to couple data processors on a serial communications path to form a network and to transfer data by means of addressed data packets including a header portion (defining the address of an intended processor) and a data portion (containing a message intended for that addressee processor). In operation, conventionally, an addressee processor may monitor the communications path, identify a passing packet addressed to it, remove that packet from the path, and then store that packet and subsequently retrieve, or copy, that packet for further processing as required. In following this course of action, the addressed processor must perform relatively high level processing activities dedicated to the desired processing (for example, demultiplexing of various header and message portions of the received packet to establish individual sessions).

While this approach does effectively permit communications among data processors in a network, those communications are achieved in a relatively inefficient manner, due principally to the relatively high level processing activity required.

It is an object of the present invention to provide an improved system for transferring message packets between data processors coupled on a communications path.

It is a further object to provide an improved system for transferring message packets between coupled data processors while requiring only relatively low level processing activity.

Another object is to provide a system for transferring message packets between coupled data processors wherein such transfers are subject to authentication.

Yet another object is to provide a system for transferring data packets between coupled data processors with a minimum of copying of received packets.

SUMMARY OF THE INVENTION

Briefly, the present invention is a system for transferring solicited message packets between data processors. The data processors are coupled on a serial communications path, with each data processor including a central processing unit and an associated storage device, or memory. At least one of the data processors (a "solicitor processor") is adapted to allocate a portion of its memory for storage of solicited message packets which might be solicited and received from at least one of the other data processors coupled to the communications path. The solicitor data processor is further adapted to define a sequence of operations to be performed on any such received solicited message packets at that processor. At least one of these operations is the operation of storing a received solicited message packet in the allocated portion of memory.

In order to advise the solicitee processor how to communicate with the solicitor data processor, the solicitor processor is also adapted for transferring a solicited message parameter signal to the solicitee data processor on the communications path, where the solicited message parameter signal is representative of a predetermined header portion of solicited data packets which might be generated by the solicitee data processor and transferred to the solicitor data processor. The header portion for a solicited message packet relates one or more of the sequences of operations which are to be associated with that packet. The solicited message parameter signal may be conventionally addressed to any or all of the other processors on the path. It may also be in the form of a solicited message packet itself, conformed to meet the parameters of a link to another solicitor processor on the path.

At least one of the other data processors coupled to the communications path is adapted to receive any solicited message parameter signal addressed to that other ("solicitee") data processor. That solicitee processor may be responsive to a received message parameter signal to generate a solicited message packet (with a header portion, as defined by the solicited message parameter signal) for transfer over the communications path to the solicitor processor. The solicitor processor is adapted to receive any such transmitted solicited message packet from the communications path, and to store that packet in the allocated portion of memory. Generally, the solicitor data processor is adapted to perform the various ones of the sequences of operations identified by the header portion of each received solicited message packet.

Thus, with the configuration of the present invention, a solicitor processor establishes a solicited packet link between itself and one or more other data processors coupled on the communications path. The solicited message packets have a header portion with a format specified by the solicited message parameter signal.

In various forms of the invention, the solicitor data processor is further adapted for performing the sequence of operations on received solicited message packets. One of those operations may include the generation of a "packet received" signal indicative of the receipt of a solicited message packet from a solicitee data processor elsewhere on the communications path. In different forms of the invention, the packet received signal may also be representative of the storage location of that packet in the allocated portion of memory, and it may further be representative of the identification of the solicitee data processor which generated the received packet. The packet receipt signal may be transferred to the central processing unit of the solicitor data processor. Where the central processing unit is adapted for performing one or more processes, the packet received signal may control the central processing unit to interact with one or more of the processes. According to one aspect of the invention, a solicitor data processor may store data representative of sets of instructions for performing ones of the sequences of operations. In this case, the solicited message parameter signal includes data representative of the identity of one or more of said sets of instructions which is to be incorporated by the solicitee data processor in the header portion of solicited data packets so that the predetermined header portion of those packets includes data representative of the identity of one or more of the sets of instructions.

In one form of the invention, the header portion for the respective solicited message packets defines the identity of storage locations in the solicitor data processor memory so that relatively little processing of any received solicited message packet is required to appropriately store the data portion of that message, Further, in some embodiments, the header portion may include in addition to a coded storage location in the memory of the solicitor data processor, a verification portion. This verification portion includes data having a predetermined relationship with verification data stored at the specific location in the solicitor data processor. Upon receipt of a solicited message packet, the solicitor data processor compares the verification portion of the header of the packet with the verification data at the location specified by the address portion of the header of that packet. When the verification portion and verification data are related by the predetermined relationship, one of the predetermined sequences of operations may be then performed by the solicitor data processor. Again, all this processing may be performed at a relatively low level processing activity without requiring the "full attention" of the one data processor.

BRIEF DESCRIPTION OF THE DRAWINGS

The foregoing and other objects of this invention, the various features thereof, as well as the invention itself, may be more fully understood from the following description, when read together with the accompanying drawings in which.

DESCRIPTION OF THE PREFERRED EMBODIMENT

Figure 1:
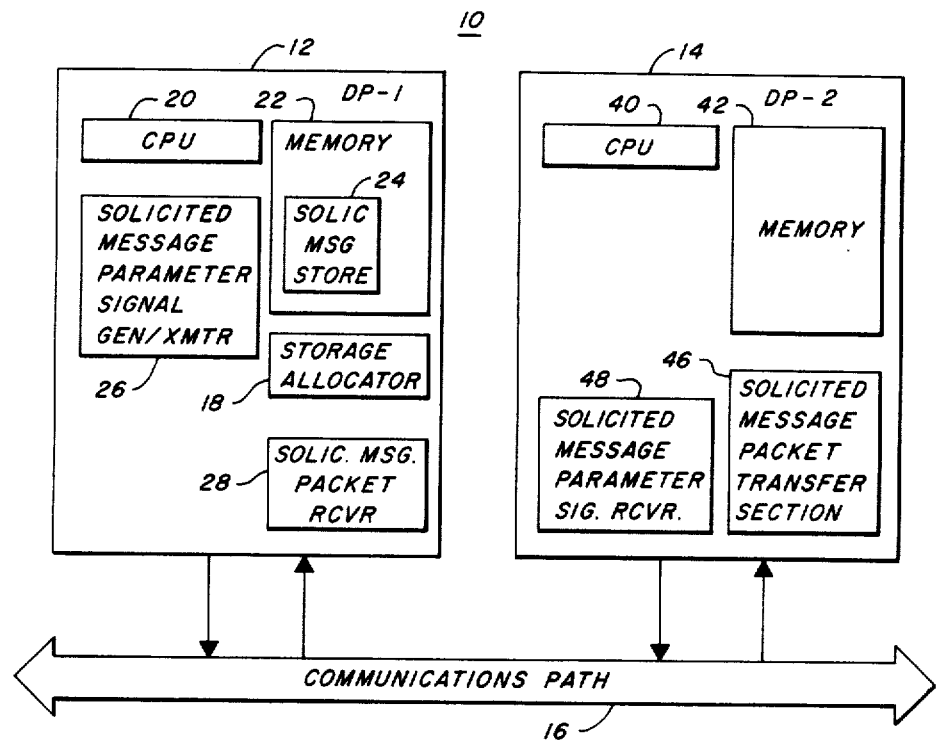
FIG. 1 shows in block diagram form, an exemplary system for transferring solicited message packets in accordance with the present invention.

FIG. 1 shows an exemplary system 10 for transferring solicited message packets between a plurality of data processors 12 and 14 coupled to a serial communications path 16. In the illustrated embodiment, the data processor 12 is a so-called "solicitor" data processor which expects to receive data packets which are solicited from the so-called "solicitee" data processor 14. In alternative embodiments, either of these data processors may include similar components to those in the other, to permit two way solicited message packet transfer. Additional data processors coupled to the communications path 16 may also include the blocks illustrated in processors 12 and 14 which are necessary for such processors to be solicitor and/or solicitee processors. The various blocks in the data processors 12 and 14 are described herein as hardware but may alternatively be functionally embodied in the form of software (or firmware) stored and adapted for use in conjunction with the respective central processing units of those processors.

The data processor 12 includes a central processing unit 20, and an associated memory 22. As shown, the data processor 12 includes a storage allocator 18 adapted to allocate a portion of the memory 22 (denoted solicited message store 24) for the storage of solicited message packets to be received from data processor 14 (or other processors coupled to communications path 16). That allocated portion may be, but is not necessarily, contiguous in memory 22. The data processor 12 further includes a solicited message parameter signal generator 26 which is operative in response to commands from the central processing unit 20 to generate solicited message parameter signals addressed to selected data processors coupled to the path 16. The solicited message parameter signal defines a predetermined header portion for use by any solicitee processor in generating a solicited data packet to be sent from that solicitee processor, along path 16 to the data processor 12. Typically, that header might include an address representative of the identity of data processor 12, and a portion indicative of the "solicited" status of the data packet.

The data processor 12 is further adapted to define a sequence of operations to be selectively performed by processor 12 on received solicited message packets at that data processor. The sequences of operations include the storage of a received solicited message packet in the allocated solicited message store 24, and, by way of example, may further include the operation of causing the CPU 20 to interact with a process presently being performed. The particular sequences of operations to be performed in association with any received solicited message packet are dependent upon the content of the header portion of that packet.

In the present embodiment, the header portion for a solicited message packet, as defined by generator 26 in the solicited message parameter signal, includes encoded portions representative of locations in memory 22 where sets of instructions are stored for performing one or more of the sequences of operations which are associated with the packet. In this case, the receiver 28 is adapted to decode those location-defining portions of a received solicited message parameter signal to identify (i.e. in table look-up fashion) particular instructions to be used in performing the sequences of operations associated with the received solicited message packet. In alternate embodiments, the instruction-containing locations might be directly included in the header portions, or the addresses of those instructions might be directly included in the header portion.

In addition, the header portion, as specified by generator 26, might also contain information representative of the solicitee data processor, information on a related process which is or may be performed by the solicitor CPU, as well as verification information (as described more fully below).

Data processor 12 further includes a receiver 28 adapted to receive solicited message packets addressed to the data processor 12 on the communication path 16, and to store the received packets in store 24. The data processor 12 operating system is effective to oversee the general operation of the data processor 12.

The data processor 14 includes a central processing unit 40 and an associated memory 42. A solicited message parameter signal receiver 48 of the data processor 14 monitors communications on the path 16 and identifies and receives solicited message parameter signals addressed to the data processor 14 from the data processor 12 (or any other solicitor data processor on the communication path 16). The data processor 14 further includes a solicited message packet transfer section 46 which is adapted to generate solicited data packets for transmission from data processor 14 by way of communications path 16 to the data processor 12 (or other solicitor data processors on the path 16). As noted above, the solicited message packets include a header portion, in part specifying the address of the solicitor data processor to which the packet is intended, with the remaining portion of the header conforming to the requirements defined by the message parameter signal. The data processor 14 operating system is effective to oversee the general operation of the data processor 14.

In operation, data processor 12 may selectively be adapted for receiving solicited message packets from the data processor 14 initially by allocating a portion of memory 22 to form the solicited message store 24. The processor 12 may then generate the solicited message parameter signal by means of the parameter signal generator 26 and transfer that signal on path 16, in addressed form, to the intended solicitee data processor 14.

Data processor 14 is adapted to receive that solicited message parameter signal by means of its receiver 48. The central processing unit of data processor 14 generates the requested message to send to the data processor 12 in the form of a solicited message packet (including a header portion in the form specified by the previously received solicited message parameter signal) by means of its solicited packet transfer section 46. The solicited message packet is then transmitted onto the communication path 16 and to processor 12, where that packet is then received at data processor 12 by the solicited message receiver 28. At data processor 12, this solicited data packet is identified by a solicited message receiver 28, and the header portion is decoded to identify the locations in store 24 where the packet is to be stored. Then the message portion of the solicited message packet is stored in store 24 of device 22. In alternate embodiments, the header portion may also be stored in store 24. In these cases, a minimum of copying of a received packet is required.

In the preferred form of the invention, the header portion of the solicited message packet, as defined by solicited message parameter signal, includes data representative of the locations in the memory 22 which contains sets of instructions corresponding to various ones of the sequences of operations. That data is decoded so that the corresponding locations are identified for subsequent processing pursuant to those instructions. The data processor 12 is then generally further operative to perform those specified operations automatically. For example, such a function would be to advise a process which could be or is running on the CPU of the solicitor processor.

In a further variation of the system, the header portion of the solicited message packet (as specified by the solicited message parameter signal) may further include a memory address portion and a verification portion in the header of the solicited message packet. In this form of the invention, the memory address portion includes data representative of the locations in the store 24 of memory 22 of pre-stored verification data. The verification portion of the header includes data having a predetermined relationship with verification data pre-stored at those locations (specified by the memory address portion) in memory 22.

In operation, upon receipt of a solicited message packet, receiver 28 decodes the address portion of the header to identify the location of the verification data in memory 22, and extracts that data. Receiver 28 then compares that extracted verification data with the verification portion of the header of the packet. When the verification portion and the verification data are related by a predetermined relationship, one or more of the pre-programmed sequences of operations is performed. In this manner, the solicited data packet may be authenticated as being from the data processor 14, if desired. In other forms of the invention, the relation between the verification portion of the header and the verification data in memory 22 may be used to determine which of the sequences of operations are to be performed on the received packet.

In another form of the invention, upon the receipt of the solicited packet, the solicited message receiver 28 generates a "packet received" (PR) signal and transfers that PR signal to the CPU 20 of data processor 12. That PR signal may, in various forms of the invention, advise CPU 20 of the receipt of a solicited message packet, and identify to CPU 20 the solicitee processor which generated that packet. The PR signal may also indicate to CPU 20 that a particular process should be performed, or, for a currently running process, indicate that the process should be advised of the receipt of the solicited data packet.

In alternative embodiments, a signal may be generated by the solicited message receiver 28 and put in the form of a signal addressed to the solicitee processor 14, which in turn is transferred back to that processor 14 by way of path 16. At that point, the CPU 40 may be apprised of the receipt of its solicited message packet by the intended solicitor processor 12.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. A system for transferring solicited message packets from at least one solicitee data processor to at least one solicitor data processor, comprising:

A. a plurality of data processors coupled on a serial communications path, each data processor including a central processing unit and an associated means for storing data, B. allocation means associated with at least one solicitor data processor for allocating a portion of its associated storage means for storage of solicited message packets to be received from at least one of said solicitee data processors, and means for defining a sequence of operations to be performed on said received solicited message packets at said solicitor data processor, at least one of said operations being the storage operation of storing a received solicited message packet in said allocated portion, each of said solicited message packets including a predetermined header portion relating said solicited message packet to one or more associated ones of said sequences of operations, C. solicitation means associated with said solicitor data processor for generating and transferring a solicited message parameter signal to at least one solicitee data processor, said solicited message parameter signal being representative of said predetermined header portion for said solicited message packet, D. solicited message packet transfer means associated with said solicitee data processor, including means for receiving said solicited message parameter signal, and means responsive thereto for generating said solicited message packet, said solicited message packet including at least a predetermined header portion, and including means for transferring said solicited message packet over said communications path to said solicitor data processor, and E. receiving means at said solicitor data processor for receiving said transferred solicited message packets from said communications path and for storing said received solicited message packets in said allocated portion.

2. A system according to claim 1 wherein at least one of said solicitor data processors includes means for generating a packet received signal, said packet received signal being indicative of the receipt of a solicited message packet from one of said solicitee data processors.

3. A system according to claim 2 wherein said packet received signal generating means further includes means for generating said packet received signal whereby said packet received signal is indicative of the storage location of said received solicited message packet in said allocated portion.

4. A system according to claim 2 wherein said packet received signal generating means further includes means for generating said packet received signal whereby said packet received signal is indicative of the identity of the solicitee data processor which transmitted said received solicited message packet.

5. A system according to claims 1 or 2 or 3 or 4 wherein at least one of said solicitor data processors includes means for performing said associated sequences of operations on said received solicited message packets.

6. A system according to claims 2 or 3 or 4 wherein said central processing unit is adapted to perform one or more processes and wherein said solicitor data processor includes means for transferring said packet received signal to the central processing unit of said solicitor data processor, and wherein said central processing unit is responsive to the receipt of said packet received signal to interact with one of said processes.

7. A system according to claim 1 wherein said solicitor data processor includes means for storing data representative of sets of instructions for performing ones of said sequences of operations, and wherein said solicitation means includes means for generating said solicited message parameter signal whereby said signal includes data representative of the identity of one or more of said sets of instructions, and wherein said means for generating said solicited message packets includes means for generating said solicited data packets whereby the predetermined header portion of said packets includes data representative of the identity of one or more of said sets of instructions.

8. A system according to claims 1 or 7 wherein said header portion includes a storage data portion representative of the location in said storage means of said solicitor data processor to be used for storing said solicited message packets, and wherein said sequence of operations includes the operation of decoding said storage data portion to identify said storage location.

9. A system according to claim 8 wherein said header portion includes an address portion and a verification portion, said address portion including data representative of a location in said storage means of said solicitor data processor, and said verification portion including data having a predetermined relationship with verification data stored at said location in said solicitor data processor.

10. A system according to claim 9 wherein said solicitor processor further comprises means selectively operative upon receipt of a solicited message packet for decoding said address portion to identify the storage location of said verification data and for extracting said verification data from said location and for comparing the verification portion of the header of said packet with said extracted verification data.

11. A system according to claim 10 wherein said comparison means further includes means for determining when said verification portion and said verification data are related by said predetermined relationship and, in response to said determination, for performing one or more of said sequences of operatfons.

12. A system according to claim 11 wherein one or more of said performed sequences are defined by said predetermined relationship.

13. A system according to claim 5 wherein said header portion includes a storage data portion representative of the location in said storage means of said solicitor data processor to be used for storing said solicited message packets, and wherein said sequence of operations includes the operation of decoding said storage data portion to identify said storage location.

14. A system according to claim 13 wherein said header portion includes an address portion and a verification portion, said address portion including data representative of a location in said storage means of said solicitor data processor, and said verification portion including data having a predetermined relationship with verification data stored at said location in said solicitor data processor.

15. A system according to claim 14 wherein said solicitor processor further comprises means selectively operative upon receipt of a solicited message packet for decoding said address portion to identify the storage location of said verification data and for extracting said verification data from said location and for comparing the verification portion of the header of said packet with said extracted verification data.

16. A system according to claim 15 wherein said comparison means further includes means for determining when said verification portion and said verification data are related by said predetermined relationship and, in response to said determination, for performing one or more of said sequences of operations.

17. A system according to claim 16 wherein one or more of said performed sequences are defined by said predetermined relationship.

* * * * *